United States Patent
Barbosa

(10) Patent No.: US 8,730,696 B2
(45) Date of Patent: May 20, 2014

(54) MULTI-LEVEL VOLTAGE CONVERTER

(75) Inventor: Peter Barbosa, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 29 days.

(21) Appl. No.: 13/549,984

(22) Filed: Jul. 16, 2012

(65) Prior Publication Data

US 2014/0016380 A1 Jan. 16, 2014

(51) Int. Cl.
*H02M 7/48* (2006.01)
*H02M 7/5387* (2007.01)

(52) U.S. Cl.
USPC ............................................ 363/71; 363/132

(58) Field of Classification Search
USPC ................... 363/43, 66, 137, 71, 132
See application file for complete search history.

(56) References Cited

U.S. PATENT DOCUMENTS

| | | | | |
|---|---|---|---|---|
| RE37,126 | E * | 4/2001 | Peng et al. ..................... | 363/137 |
| 6,930,899 | B2 * | 8/2005 | Bakran et al. ................. | 363/132 |
| 6,969,967 | B2 * | 11/2005 | Su ................................. | 318/801 |
| 7,830,680 | B2 * | 11/2010 | Eguchi et al. .................. | 363/37 |
| 7,839,023 | B2 * | 11/2010 | Jacobson et al. .............. | 307/77 |
| 8,144,490 | B2 * | 3/2012 | El-Barbari et al. ............ | 363/43 |
| 8,456,128 | B2 * | 6/2013 | Fotherby ........................ | 318/800 |
| 2011/0273916 | A1 * | 11/2011 | Fujiwara et al. ................ | 363/71 |
| 2012/0069612 | A1 * | 3/2012 | Hasler ............................ | 363/71 |

FOREIGN PATENT DOCUMENTS

| | | |
|---|---|---|
| JP | 2000-166251 | 2/2000 |
| JP | 2008-048536 | 2/2008 |
| WO | WO 2010/146637 | 12/2010 |

OTHER PUBLICATIONS

M.E. Ahmed et al. "Development of High Gain and Efficiency Photovoltaic System Using Multilevel Boost Converter Topology." 2010 2nd IEEE International Symposium on Power Electronics for Distributed Generation Systems. Jun. 16-18, 2010. pp. 898-903.*
H.Sun et al. "Novel H-bridge Multi-level Inverter with DC-link Switches". IEEE 8th International Conference on Power Electronics—ECCE Asia. May 30-Jun. 3, 2011. The Shilla Jeju, Korea. pp. 1734-1741.*
J.C. Rosas-Caro, et al. "Novel DC-DC Multilevel Boost Converter". IEEE Power Electronics Specialists Conference, 2008. Jun. 15-19, 2008. pp. 2146-2151.*
H. Keivani, et al. "Novel Multi-Carrier PWM Method for a Three-Phase Cascaded H-Bridge Multi-Level Inverter". Proceedings of the 41st International Universities Power Engineering Conference, 2006. vol. 2. Sep. 6-8, 2006. pp. 593-597.*
M. Veenstra and A. Rufer. "Control of a Hybrid Asymmetric Multilevel Inverter for Competitve Medium-Voltage Industrial Drives." IEEE Transactiions on Industry Applications. vol. 41 No. 2. Mar./Apr. 2005.*
Veenstra, Martin et al., "Control of a Hybrid Asymmetric Multilevel Inverter for Competitive Medium-Voltage Industrial Drives", IEEE Transactions on Industry Applications, vol. 41, No. 2, Mar./Apr. 2005, pp. 655-664.

* cited by examiner

Primary Examiner — Gary L Laxton
Assistant Examiner — Kevin H Sprenger
(74) Attorney, Agent, or Firm — Lowe Hauptman & Ham, LLP

(57) ABSTRACT

A multi-level voltage converter includes a multi-point converter circuit and at least one full bridge inverter circuit. The multi-point converter circuit is configured for converting a DC voltage into an intermediate multi-level voltage. The full bridge inverter circuit is electrically connected in series with the multi-point converter circuit and configured for receiving the intermediate multi-level voltage to generate a multi-level output voltage corresponding to a single phase output.

8 Claims, 3 Drawing Sheets

MULTI-LEVEL VOLTAGE CONVERTER

BACKGROUND

1. Technical Field

The present disclosure relates to a converter. More particularly, the present disclosure relates to a multi-level voltage converter.

2. Description of Related Art

There is a growing demand for voltage power conversion systems which are able to provide desired output voltages and to have good spectral performance and control. A known method for achieving desired output voltage levels from a power conversion system is to utilize a multi-level power converter topology.

Multi-level power converter topology has been used widely for power applications such as variable speed drive (VSD) systems, wind turbine generators, electric power distribution systems, etc. Power voltages with a higher number of voltage levels are applied to synthesize waveforms with a better harmonic spectrum. In other words, multi-level converters can reach desired voltage and minimize induced harmonics.

However, a typical multi-level converter has limits of outputting a power voltage with an increased number of voltage levels and is thus not easily controlled. In addition, since the number of converter levels required in any multi-level converter topology depends on the desired output voltage levels, increasing the number of converter levels also increases the control complexity and cost of converter circuits.

SUMMARY

An aspect of the present disclosure is related to a multi-level voltage converter. The multi-level voltage converter includes a multi-point converter circuit and at least one full bridge inverter circuit. The multi-point converter circuit is configured for converting a DC voltage into an intermediate multi-level voltage. The full bridge inverter circuit is electrically connected in series with the multi-point converter circuit and configured for receiving the intermediate multi-level voltage to generate a multi-level output voltage corresponding to a single phase output.

Another aspect of the present disclosure is related to a multi-level voltage converter. The multi-level voltage converter includes a multi-point converter circuit and a plurality of cascade-connected full bridge inverter circuits. The multi-point converter circuit is configured for converting a DC voltage into an intermediate three-level voltage. The cascade-connected full bridge inverter circuits are electrically connected in series with the multi-point converter circuit and configured for receiving the intermediate three-level voltage to generate a ($2^{n+1}$+1)-level output voltage corresponding to a single phase output, in which n is an amount of the cascade-connected full bridge inverter circuits.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

Figure 1:
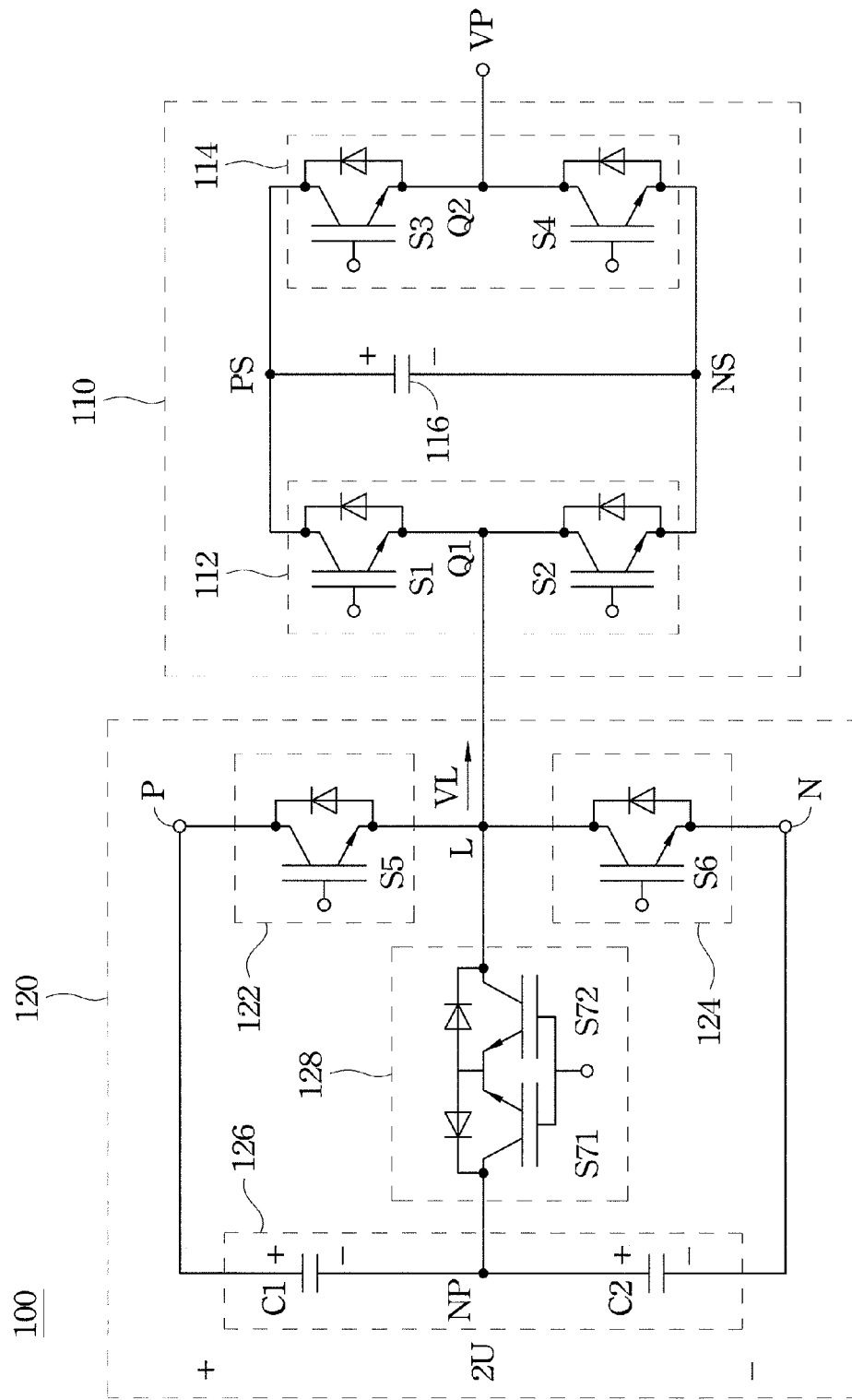
FIG. 1 is a schematic diagram of a multi-level voltage converter according to one embodiment of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a multi-level voltage converter according to one embodiment of the present disclosure. The multi-level voltage converter 100 includes at least one full bridge inverter circuit 110 and a multi-point converter circuit 120 (i.e., N-point converter circuit). The multi-point converter circuit 120 is configured for converting a DC voltage 2U into an intermediate multi-level voltage VL. The full bridge inverter circuit 110 is electrically connected in series with the multi-point converter circuit 120 to a single phase output and configured for receiving the intermediate multi-level voltage VL to generate a multi-level output voltage VP corresponding to the single phase output.

Figure 2:
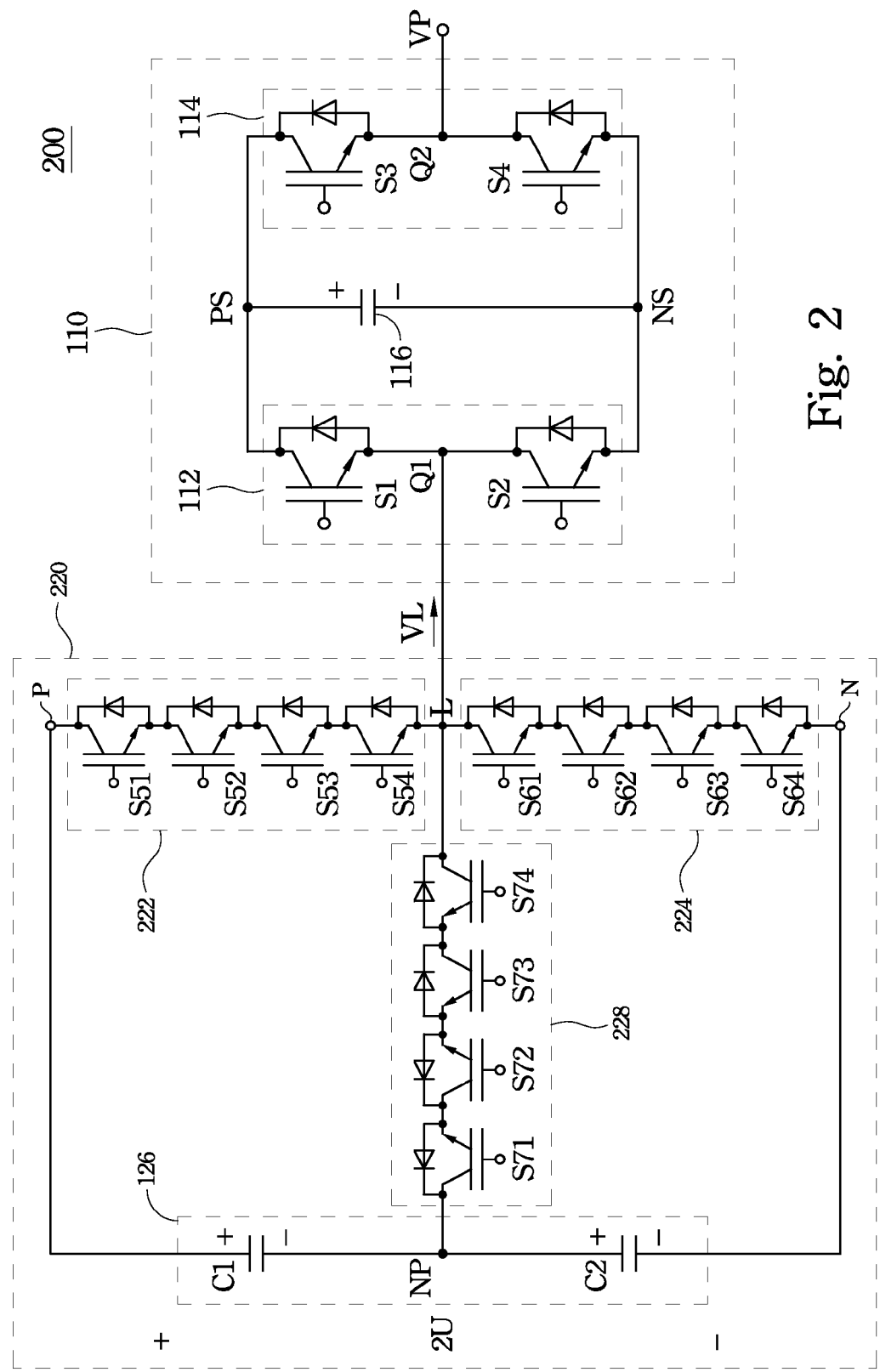
FIG. 2 is a schematic diagram of a multi-level voltage converter according to another embodiment of the present disclosure.
Figure 3:
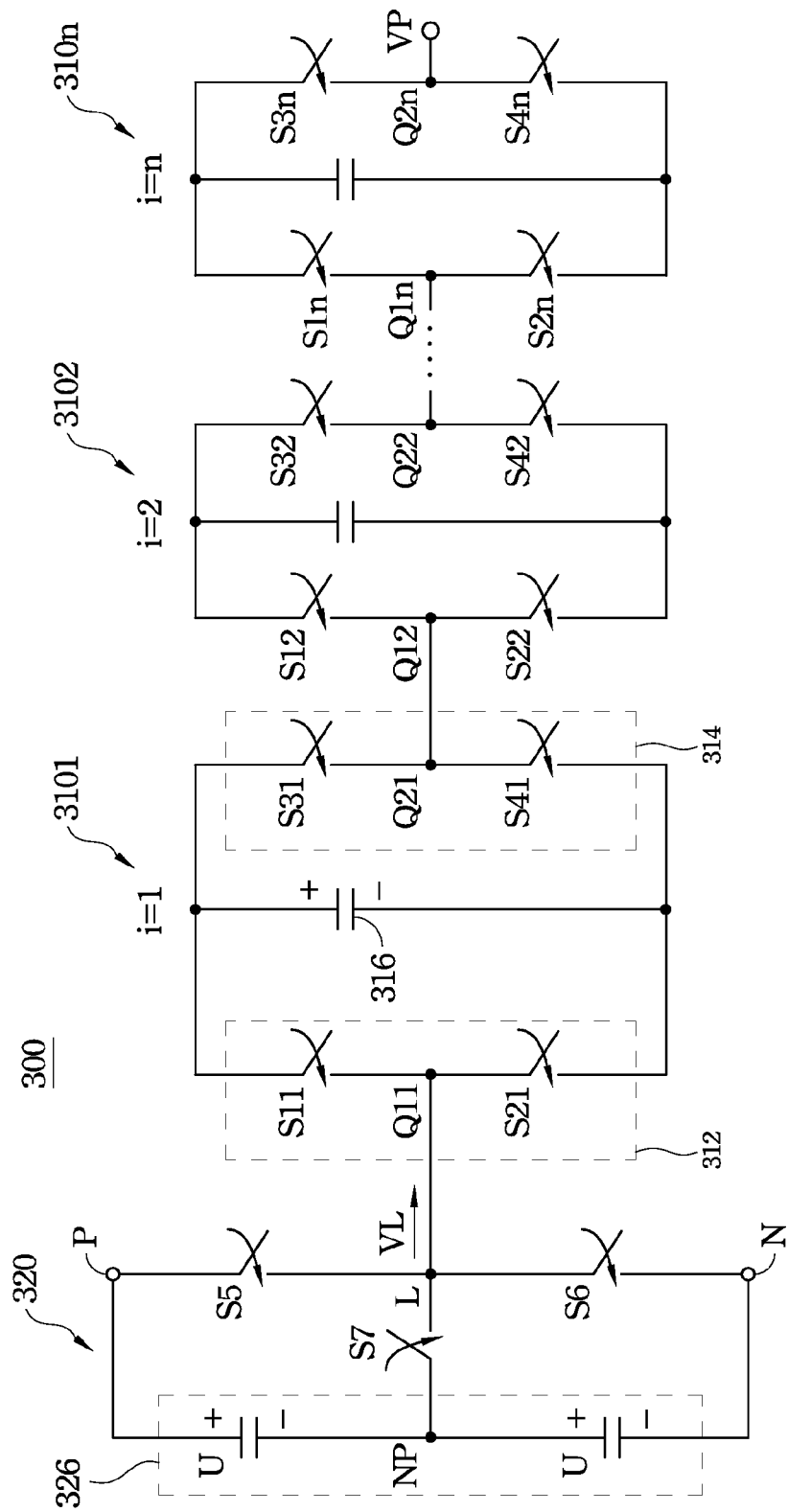
FIG. 3 is a schematic diagram of a multi-level voltage converter according to yet another embodiment of the present disclosure.

For convenience of illustration and for convenience of explaining the functionality and operation of one phase of the multi-level voltage converter which may have multiple phase outputs, the serial connection of the multi-point converter circuit with the full bridge inverter circuit in the present disclosure is merely illustrated for the single phase of the multi-level voltage converter. In other words, there may be three circuits (each of which can be configured as shown in FIG. 1, or FIG. 2 or FIG. 3 shown below) electrically connected in parallel on a DC side to construct the multi-level voltage converter as a three-phase voltage converter.

In the present embodiment, the full bridge inverter circuit 110 further includes a first switching pair 112, a second switching pair 114 and a voltage supporting device 116. The first switching pair 112 includes two switching devices S1 and S2 connected in series at a primary node Q1 between a positive node PS and a negative node NS. The second switching pair 114 includes two switching devices S3 and S4 connected in series between the positive node PS and the negative node NS at a secondary node Q2 configured for outputting the multi-level output voltage VP. The voltage supporting device 116 is electrically connected in parallel with the first switching pair 112 and the second switching pair 114 between the positive node PS and the negative node NS.

In practice, the voltage supporting device 116 can be a capacitor, a DC voltage source, etc., which is able to maintain a DC voltage for a sufficient period of time, and each of the switching devices S1, S2, S3 and S4 can be implemented by a switch selected from the group consisting of an insulated gate bipolar transistor (IGBT), an integrated gate-commutated thyristor (IGCT), a power MOSFET, a bipolar junction transistor, etc., with an anti-parallel diode connected in parallel and reverse-biased with respect to the switch. Moreover, each of the first switching pair 112 and the second switching pair 114 can be implemented by an IGBT module including two IGBTs and respective anti-parallel diodes connected in parallel thereto.

According to the configuration of the full bridge inverter circuit 110, the full bridge inverter circuit 110 can be designed and operated easily because its modular configuration provides flexibility for easy expansion of the number of levels without introducing undue complexity in the power circuit.

On the other hand, the multi-point converter circuit 120 may further include a first switch unit 122, a second switch unit 124, an intermediate unit 126, and a third switch unit 128. The second switch unit 124 is electrically connected in series with the first switch unit 122 at an intermediate output terminal L, and the intermediate output terminal L is connected to the primary node Q1 of the full bridge inverter circuit 110 and configured for outputting the intermediate multi-level voltage VL, in which the first switch unit 122 is connected between the intermediate output terminal L and a positive DC terminal P, and the second switch unit 124 is connected between the intermediate output terminal L and a negative DC terminal N. The intermediate unit 126 includes two capacitors C1 and 02 electrically connected in series at a neutral point terminal NP between the positive DC terminal P and the negative DC terminal N, and in parallel with the serial connection of the first switch unit 122 and the second switch unit 124. Furthermore, the third switch unit 128 is electrically connected between the intermediate output terminal L and the neutral point terminal NP.

In the present embodiment, the first switch unit 122 further includes a switching device S5, and the second switch unit 124 further includes a switching device S6, in which the switching device S5 and the switching device S6 are connected in series to the intermediate output terminal L between the positive DC terminal P and the negative DC terminal N.

Moreover, the third switch unit 128 may further include two switching devices S71 and S72 connected anti-serially (i.e., back-to-back connection) between the intermediate output terminal L and the neutral point terminal NP. The anti-serial connection of the switching devices S71 and S72 is configured for a current to flow back and forth between the intermediate output terminal L and the neutral point terminal NP.

The first switch unit 122, the second switch unit 124 and the third switch unit 128 are arranged in parallel to each other between the intermediate output terminal L and the neutral point terminal NP, so that the configuration of the multi-point converter circuit 120 has three commutation paths between the intermediate output terminal L and the neutral point terminal NP, and each of the commutation paths is short and thus easily controlled.

In practice, each of the switching devices S5, S6, S71 and S72 can be implemented by a switch selected from the group consisting of an IGBT, an IGCT, a power MOSFET, a bipolar junction transistor, etc., with an anti-parallel diode connected in parallel and reverse-biased with respect to the switch. Moreover, each of the first switch unit 122, the second switch unit 124 and the third switch unit 128 can be implemented by an IGBT module as well.

According to the configuration of the multi-point converter circuit 120, the multi-point converter circuit 120 can be operated to have multiple commutation paths between the intermediate output terminal L and the neutral point terminal NP, and each of the commutation paths is short and thus easily controlled. Furthermore, the configuration of the multi-point converter circuit 120 allows a modular design as well, and thus no complex circuitry is required such that the circuitry is simplified. In addition, the configuration of the multi-point converter circuit 120 simplifies the bus bar design since the switching loops (e.g., the loop formed from the neutral point terminal NP to the intermediate output terminal L) are simplified compared to the loops in a conventional multi-point converter circuit.

In operation, assuming that each of the capacitors C1 and C2 is able to maintain a voltage U, the multi-point converter circuit 120 has three switching stages. In the first switching stage, the switching device S5 is turned on and the switching devices S6, S71, S72 are turned off, and the intermediate multi-level voltage VL becomes U. In the second switching stage, the switching devices S71, S72 are turned on and the switching devices S5, S6 are turned off, and the intermediate multi-level voltage VL is equal to zero. In the third switching stage, the switching device S6 is turned on while the switching devices S5, S71, S72 are turned off, and the intermediate multi-level voltage VL becomes −U.

Moreover, assuming that the voltage supporting device 116 is able to maintain a voltage U/2, the multi-level output voltage VP has five voltage levels (i.e., U, U/2, 0, −U/2, −U) according to the operations of the multi-point converter circuit 120 and the full bridge inverter circuit 110. Specifically, in the condition of the switching device S5 being turned on, when the switching devices S1 and S3 are turned on, the multi-level output voltage VP becomes U; in the condition of the switching device S5 being turned on, when the switching devices S1 and S4 are turned on, the multi-level output voltage VP becomes U/2; in the condition of the switching devices S71, S72 being turned on, when the switching devices S1 and S3 are turned on, the multi-level output voltage VP is equal to zero; and the voltage levels −U/2 and −U may be deduced by analogy (for example, the operation in the condition of the switching device S6 being turned on). The aforementioned operations would be understood by persons of ordinary skill in the art, so they are not described in further detail herein.

FIG. 2 is a schematic diagram of a multi-level voltage converter according to another embodiment of the present disclosure. As illustrated in FIG. 2, the multi-level voltage converter 200 includes the full bridge inverter circuit 110 and a multi-point converter circuit 220, in which the connections and operations of the full bridge inverter circuit 110 and the multi-point converter circuit 220 are similar to those disclosed in FIG. 1, and the connections of the first switch unit 222, the second switch unit 224, the intermediate unit 126, and the third switch unit 228 are similar to those disclosed in FIG. 1 as well.

In the present embodiment, compared to FIG. 1, the first switch unit 222 further includes a plurality of switching devices (e.g., S51, S52, S53, S54) electrically connected in series to the intermediate output terminal L, the second switch unit 224 further includes a plurality of switching devices (e.g., S61, S62, S63, S64) electrically connected in series to the intermediate output terminal L, and the third switch unit 228 further includes two groups of switching devices, which are connected anti-serially between the intermediate output terminal L and the neutral point terminal NP, in which each of the two groups includes a plurality of switching devices electrically connected in series (e.g., one group including switching devices S71, S72, and the other group including switching devices S73, S74).

Specifically, the switching devices S51, S52, S53, S54 are connected in series with the capacitor C1 between the intermediate output terminal L and the neutral point terminal NP to form a commutation path, the switching devices S61, S62, S63, S64 are connected in series with the capacitor C2 between the intermediate output terminal L and the neutral point terminal NP to form another commutation path, and the group including the switching devices S71, S72 and the other group including the switching devices S73, S74 are connected anti-serially (i.e., back-to-back connection) between the intermediate output terminal L and the neutral point terminal NP to form still another commutation path and to be configured for a current to flow back and forth between the intermediate output terminal L and the neutral point terminal NP, thus resulting in each of the commutation paths being short and easily controlled.

In one embodiment, an amount of the series-connected switching devices in each of the first switch unit 222 and the second switch unit 224 can be increased to be any amount that is two times the amount of the series-connected switching devices in each of the two groups of switching devices in the third switch unit 228, in order to block the voltage which is two times the voltage across each of the switching devices S1, S2, S3 and S4.

In practice, each of the switching devices S51-S54, S61-S64, S71-S74 can be implemented by a switch selected from the group consisting of an IGBT, an IGCT, a power MOSFET, a bipolar junction transistor, etc., with an anti-parallel diode connected in parallel and reverse-biased with respect to the switch. Moreover, each of the first switch unit 222, the second switch unit 224 and the third switch unit 228 can be implemented by one or more IGBT modules as well.

The operation of the multi-level voltage converter 200 is similar to that shown in FIG. 1, and thus the operations would be understood by persons of ordinary skill in the art, so they are not described in further detail herein.

FIG. 3 is a schematic diagram of a multi-level voltage converter according to yet another embodiment of the present disclosure. The multi-level voltage converter 300 includes a plurality of cascade-connected full bridge inverter circuits (i.e., full bridge inverter circuits 3101, 3102, ..., 310n) and a multi-point converter circuit 320. The multi-point converter circuit 120 is configured for converting a DC voltage (e.g., the voltage 2U) into the intermediate three-level voltage VL (e.g., the voltage VL with levels of U, 0, and −U). The cascade-connected full bridge inverter circuits 3101, 3102, ..., 310n are electrically connected in series with the multi-point converter circuit 320 to a single phase output and configured for receiving the intermediate three-level voltage VL to generate a ($2^{n+1}$+1)-level output voltage VP corresponding to the single phase output, in which n is an amount of the cascade-connected full bridge inverter circuits.

Each of the cascade-connected full bridge inverter circuits may further include a first switching pair 312, a second switching pair 314 and a voltage supporting device 316. The first switching pair 312 comprising two switch units S11 and S21 connected in series at a primary node (e.g., Q11). The second switching pair 314 includes two switching units S31 and S41 connected in series at a secondary node (e.g., Q21), in which the secondary node is connected to the primary node of a following full bridge inverter circuit (for example, the secondary node Q21 of the full bridge inverter circuit 3101 is connected to the primary node Q12 of the full bridge inverter circuit 3102). The voltage supporting device 316 is electrically connected in parallel with the first switching pair 312 and the second switching pair 314.

In the present embodiment, the primary node of a first one of the cascade-connected full bridge inverter circuits (i.e., the primary node Q11 of the full bridge inverter circuit 3101) is configured for receiving the intermediate three-level voltage VL, and the secondary node of a last one of the cascade-connected full bridge inverter circuits (i.e., the secondary node Q2n of the full bridge inverter circuit 310n) is configured for outputting the ($2^{n+1}$+1)-level output voltage. In other words, the amount of the full bridge inverter circuits can be increased according to practical needs, such that the number of voltage levels of the multi-level voltage converter 300 increases, and the waveform of output of the multi-level voltage converter 300 approaches a pure sine wave, thus resulting in lower harmonics in each output phase voltage.

In addition, each of the switch units in the first switching pair 312 and the second switching pair 314 in an i-th-order full bridge inverter circuit (i.e., full bridge inverter circuit 310i) of the cascade-connected full bridge inverter circuits may further include $2^{(n-i)}$ switching devices, where i=1, 2, 3, ..., n. Specifically, for the switch units S1i, S2i, S3i and S4i, each of them correspondingly includes $2^{(n-i)}$ switching devices connected in series to the primary node or the secondary node, in order that the switch units S1n, S2n, S3n and S4n is able to block the lowest voltage $U/2^n$ in the multi-level voltage converter 300.

Similarly, the multi-point converter circuit 320 may further include a first switch unit S5, a second switch unit S6, an intermediate unit 326, and a third switch unit S7. The second switch unit S6 is electrically connected in series with the first switch unit S5 at the intermediate output terminal L, and the intermediate output terminal L is connected to the primary node of the first one of the cascade-connected full bridge inverter circuits, i.e., the primary node Q11 of the full bridge inverter circuit 3101, and configured for outputting the intermediate three-level voltage VL, in which the first switch unit S5 is connected between the intermediate output terminal L and the positive DC terminal P, and the second switch unit S6 is connected between the intermediate output terminal L and the negative DC terminal N. The intermediate unit 326 includes two capacitors C1 and C2 electrically connected in series at the neutral point terminal NP between the positive DC terminal P and the negative DC terminal N, and in parallel with the serial connection of the first switch unit S5 and the second switch unit S6. Furthermore, the third switch unit S7 is electrically connected between the intermediate output terminal L and the neutral point terminal NP.

In one embodiment, each of the first switch unit S5 and the second switch unit S6 may include a single switching device connected to the intermediate output terminal L, which is similar to that shown in the embodiment illustrated in FIG. 1. Moreover, the third switch unit S7 may further include two switching devices connected anti-serially between the intermediate output terminal L and the neutral point terminal NP, which is similar to that shown in the embodiment illustrated in FIG. 1 as well.

In another embodiment, each of the first switch unit S5 and the second switch unit S6 may further include a plurality of switching devices electrically connected in series to the intermediate output terminal VL, which is similar to that shown in the embodiment illustrated in FIG. 2.

Moreover, the third switch unit S7 may further include two groups of switching devices, that are connected anti-serially between the intermediate output terminal VL and the neutral point terminal NP, in which each of the two groups includes a plurality of switching devices electrically connected in series, which is similar to that shown in the embodiment illustrated in FIG. 2 as well.

In still another embodiment, an amount of the series-connected switching devices in each of the first switch unit S5 and the second switch unit S6 is $2^{(n+1)}$, and an amount of the series-connected switching devices in each of the two groups of switching devices in the third switch unit S7 is $2^n$, in order to block the voltage which is multiple times the voltage across each of the switching devices S1n, S2n, S3n and S4n.

Therefore, as mentioned above, each of the switch units S1i, S2i, S3i, S4i, S5, S6, and S7 may include a corresponding number of switching devices according to practical needs. For example, in the condition that there are two cascade-connected full bridge inverter circuits (i.e., n=2) which are connected in series with the multi-point converter circuit 320, each of the switch units S12, S22, S32, S42 in the full bridge inverter circuit 3102 may include a single switching device, each of the switch units S11, S21, S31, S41 in the full bridge inverter circuit 3101 may include two switching devices connected in series, each of the first switch unit S5 and the second switch unit S6 in the multi-point converter circuit 320 may include eight switching devices connected in series, and each of two groups which are connected anti-serially in the third switch unit S7 may include four switching devices.

In practice, each of the aforementioned switching device may be implemented by a switch selected from the group consisting of an IGBT, an IGCT, a power MOSFET, a bipolar junction transistor, etc., with an anti-parallel diode connected in parallel and reverse-biased with respect to the switch, and each of the aforementioned switch units can be implemented by one or more IGBT modules as well.

The operation of the multi-level voltage converter 300 can be deduced by analogy to that shown in FIG. 1, and thus the operations would be understood by persons of ordinary skill in the art, so they are not described in further detail herein.

For the embodiments mentioned above, the multi-level voltage converter of the present disclosure not only can be easily configured to have a number of full bridge inverter circuits such that the number of voltage levels of the multi-level voltage converter increases and the waveform of output of the multi-level voltage converter approaches a pure sine wave, thus resulting in lower harmonics in each output phase voltage, but also can be configured to have multiple commutation paths by employing the multi-point converter circuit such that each of the commutation paths is short and thus easily controlled and the switching loops therein are simplified.

In addition, the multi-point converter circuit and the full bridge inverter circuits can all have modular configurations, which provides flexibility for easy expansion of the number of levels without introducing undue complexity in the power circuit.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A multi-level voltage converter, comprising:
a multi-point converter circuit configured for converting a DC voltage into an intermediate three-level voltage; and
a plurality of cascade-connected full bridge inverter circuits electrically connected in series with the multi-point converter circuit and configured for receiving the intermediate three-level voltage to generate a $(2^{n+1}+1)$-level output voltage corresponding to a single phase output, wherein n is a number of the cascade-connected full bridge inverter circuits,
wherein each of the cascade-connected full bridge inverter circuits further comprises:
a first switching pair comprising two switch units connected in series at a primary node;
a second switching pair comprising two switch units connected in series at a secondary node, wherein the secondary node is connected to the primary node of a following full bridge inverter circuit; and
a voltage supporting device electrically connected in parallel with the first switching pair and the second switching pair;
wherein each of the switch units in the first switching pair and the second switching pair in an i-th-order full bridge inverter circuit of the cascade-connected full bridge inverter circuits further comprises $2^{(n-i)}$ switching devices, wherein i=1, 2, 3, ..., n.

2. The multi-level voltage converter as claimed in claim 1, wherein the primary node of a first one of the cascade-connected full bridge inverter circuits is configured for receiving the intermediate three-level voltage, and the secondary node of a last one of the cascade-connected full bridge inverter circuits is configured for outputting the $(2^{n+1}+1)$-level level output voltage.

3. The multi-level voltage converter as claimed in claim 1, wherein the multi-point converter circuit further comprises:
a first switch unit;
a second switch unit electrically connected in series with the first switch unit at an intermediate output terminal connected to the primary node of a first one of the cascade-connected full bridge inverter circuits, the intermediate output terminal configured for outputting the intermediate three-level voltage;
an intermediate unit comprising two capacitors electrically connected in series at a neutral point terminal and in parallel with the serial connection of the first switch unit and the second switch unit; and
a third switch unit electrically connected between the intermediate output terminal and the neutral point terminal.

4. The multi-level voltage converter as claimed in claim 3, wherein each of the first switch unit and the second switch unit further comprises a switching device connected to the intermediate output terminal.

5. The multi-level voltage converter as claimed in claim 4, wherein the third switch unit further comprises two switching devices connected anti-serially between the intermediate output terminal and the neutral point terminal.

6. The multi-level voltage converter as claimed in claim 3, wherein each of the first switch unit and the second switch unit further comprises a plurality of switching devices electrically connected in series to the intermediate output terminal.

7. The multi-level voltage converter as claimed in claim 6, wherein the third switch unit further comprises two groups of switching devices, which are connected anti-serially between the intermediate output terminal and the neutral point terminal, wherein each of the two groups comprises a plurality of switching devices electrically connected in series.

8. The multi-level voltage converter as claimed in claim 7, wherein a number of the series-connected switching devices in each of the first switch unit and the second switch unit is $2^{(n+1)}$, and a number of the series-connected switching devices in each of the two groups of switching devices is $2^n$.

* * * * *